United States Patent
Tran et al.

(10) Patent No.: US 12,552,922 B2
(45) Date of Patent: *Feb. 17, 2026

(54) POLYMER COMPOSITION COMPRISING A RECYCLED COATED POLYOLEFIN FABRIC SUBSTRATE

(71) Applicant: BOREALIS AG, Vienna (AT)

(72) Inventors: Tuan Anh Tran, Linz (AT); Mirela Tury Pastorini, Linz (AT); Johan Defoer, Mechelen (BE)

(73) Assignee: Borealis AG, Vienna (AT)

( * ) Notice: Subject to any disclaimer, the term of this patent is extended or adjusted under 35 U.S.C. 154(b) by 952 days.

This patent is subject to a terminal disclaimer.

(21) Appl. No.: 17/768,957

(22) PCT Filed: Oct. 15, 2020

(86) PCT No.: PCT/EP2020/079015
§ 371 (c)(1),
(2) Date: Apr. 14, 2022

(87) PCT Pub. No.: WO2021/074285
PCT Pub. Date: Apr. 22, 2021

(65) Prior Publication Data
US 2024/0026134 A1 Jan. 25, 2024

(30) Foreign Application Priority Data
Oct. 15, 2019 (EP) .................................... 19203333

(51) Int. Cl.
*C08L 23/0807* (2025.01)
*C08J 7/04* (2020.01)
*C09D 123/08* (2006.01)

(52) U.S. Cl.
CPC ......... *C08L 23/0815* (2013.01); *C08J 7/0427* (2020.01); *C09D 123/08* (2013.01); *C08J 2323/16* (2013.01); *C08L 2201/02* (2013.01); *C08L 2205/025* (2013.01); *C08L 2207/064* (2013.01); *C08L 2207/20* (2013.01)

(58) Field of Classification Search
CPC ............. C08L 23/0815; C08L 2201/02; C08L 2205/025; C08L 2207/064; C08L 2207/20; C08L 2205/035; C08L 23/12; C08L 23/16; C08J 7/0427; C08J 2323/16; C09D 123/08; Y02P 20/582; C08K 3/32
See application file for complete search history.

(56) References Cited

U.S. PATENT DOCUMENTS

| | | |
|---|---|---|
| 5,266,392 A | 11/1993 | Land et al. |
| 5,811,494 A | 9/1998 | Whetten et al. |
| 2005/0127558 A1 | 6/2005 | Subramaniam et al. |
| 2008/0299853 A1 | 12/2008 | Nethers, II et al. |

FOREIGN PATENT DOCUMENTS

| | | | | |
|---|---|---|---|---|
| EP | 3031853 A1 * | 6/2016 | ................ | C08J 5/18 |
| EP | 3165473 A1 | 5/2017 | | |
| RU | 2439223 C2 | 1/2012 | | |
| RU | 2464369 C2 | 10/2012 | | |
| WO | 9708238 A1 | 3/1997 | | |
| WO | 2006109319 A1 | 10/2006 | | |
| WO | WO-2015169690 A1 * | 11/2015 | ............ | C08F 210/06 |
| WO | 2019238943 A1 | 12/2019 | | |

OTHER PUBLICATIONS

International Search Report and Written Opinion mailed Feb. 15, 2021 in International application No. PCT/EP2020/079015 (12 pages).
International Search Report and Written Opinion mailed Feb. 9, 2021 in International application No. PCT/EP2020/079013 (12 pages).

* cited by examiner

Primary Examiner — Kumar R Bhushan
(74) Attorney, Agent, or Firm — Meunier Carlin & Curfman LLC

(57) ABSTRACT

The present invention relates to a polymer composition comprising the following components: A) 5 to 35 wt.-% based on the overall weight of the polymer composition of a recycled polyolefin fabric substrate; wherein said fabric substrate is coated with a polyolefin composition comprising the following components: a1) an ethylene based plastomer with a density determined according to ISO 1183-1 in the range of 0.857 to 0.915 g/cm3 and a MFR2 (190° C., 2.16 kg) determined according to ISO 1133 in the range of 0.5 to 30 g/10 min; and a2) a propylene based plastomer with a density determined according to ISO 1183-1 in the range of 0.850 to 0.910 g/cm3 and a MFR2 (230° C., 2.16 kg) determined according to ISO 1133 in the range of 0.01 to 30 g/10 min; B) 65 to 95 wt.-% based on the overall weight of the polymer composition of a homopolypropylene or a recycled polymer blend comprising b1) polypropylene and b2) polyethylene, wherein the weight ratio of b1) to b2) is from 3:7 to 12:1; with the proviso that components A) and B) add up to 100 wt.-%. Furthermore, the present invention relates to use of component A) for increasing the Charpy Notched Impact Strength of component B) and to an article comprising the polymer composition according to the present invention.

18 Claims, 5 Drawing Sheets

POLYMER COMPOSITION COMPRISING A RECYCLED COATED POLYOLEFIN FABRIC SUBSTRATE

CROSS REFERENCE TO RELATED APPLICATIONS

This application is a United States National Phase Patent Application of International Patent Application Number PCT/EP2020/079015, filed on Oct. 15, 2020, which claims the benefit of priority to EP Application Serial No. 19203333.0, filed Oct. 15, 2019, which are incorporated by reference herein in their entireties.

The present invention relates to a polymer composition comprising at least component A) being a specific recycled coated polyolefin fabric substrate and component B) being a homopolypropylene or a recycled polymer blend comprising b1) polypropylene and b2) polyethylene. In addition, the present invention refers to the use of component A) for improving the Notch Impact Strength at 23° C. of component B) and to an article comprising the polymer composition according to the present invention.

BACKGROUND OF INVENTION

Polyolefins are increasingly consumed in large amounts in a wide range of applications. The reason for this is not only a favourable price/performance ratio, but also the high versatility of these materials and a very broad range of possible modifications, which allows tailoring of end-use properties in a wide range of applications.

During the last decade, concern about plastics and the environmental sustainability of their use in current quantities has arisen. This has led to new legislation on disposal, collection and recycling of polyolefins. There have, in addition, been efforts in a number of countries to increase the percentage of plastic materials, which are recycled instead of being sent to landfill.

One major trend in the field of polyolefins is the use of recycled materials, which are derived from a wide variety of sources. Such recycled polyolefin materials normally have properties, which are much worse than those of the virgin materials, unless the amount of recycled polyolefin added to the final compound is extremely low. Recycled polymer blends are already known in the art.

U.S. Pat. No. 5,266,392 A relates to compatibilized blends of polypropylene, linear low density polyethylene and a low molecular weight plastomer. The blend preferably contains at least about 50 percent by weight of crystalline polypropylene, from about 10 to about 50 percent by weight of LLDPE dispersed in a matrix of the polypropylene, and a compatibilizing amount of an ethylene/alpha-olefin plastomer having a weight average molecular weight between about to about 50,000, a density of less than about 0.90 g/cm$^3$, and a melt index of at least about 50 dg/min. The blend is useful in the formation of melt spun and melt blown fibers. Also disclosed are spun bonded-melt blown-spun bonded fabrics made from the blends.

U.S. Pat. No. 5,811,494 A refers to polymer compositions made from at least one polyolefin (e.g., high density polyethylene or polypropylene) blended with minor amounts of either at least one homogeneous linear ethylene/C5-C20 alpha-olefin or at least one substantially linear ethylene/C3-C20 alpha-olefin polymer. The compositions are suitable for thermoformed or molded thinwall applications such as drinking cups, lids, and food containers where the flow length to wall thickness ratios are greater than about 180:1.

EP 0 847 420 A1 relates to a packaging material or article or medical device, prepared for radiation sterilization of itself, its contents, or combinations, or which has been exposed to radiation sufficient for such sterilization; comprising a blend to from about 99% to about 50% by weight homo or copolymerized polypropylene which includes about 1% to about 50% by weight polyethylene produced by single-site catalysis.

US 2005/127558 A1 refers to a process for the preparation of polypropylene moulding compound, which comprises blending polypropylene with another polymer in the range of 20 to 50 wt.-%, adding a compatibilizer, melt kneading the mixture in presence of a low molecular weight copolymer, melt extruding the same in a twin screw melt extruder at a temperature in the range of 120 to 180° C. to give a polypropylene moulding compound.

Polymer coated textile materials are used in a wide range of applications such as carpets, mattresses, pillows and seat upholstery for office furniture, car interiors etc. Such materials desirably have a good degree of softness as well as attractive abrasion and UV resistance properties. In the market nowadays, polymer coated textile materials are made of various non-polyolefin materials, such as polyurethane (PU), polyvinyl chloride (PVC) and ethylene vinyl acetate (EVA). From sustainability perspective, these materials are challenging, if not impossible, to be recycled. Furthermore, when mixed together, it is mostly not possible to separate them properly when submitted to sorting for recycling.

US 2008/0299853 A1 describes a three layer coated fabric which has a bottom backing layer, a top coating layer and a middle coating layer that contains recycled coated fabric material. All of the constituent parts of coated fabrics being recycled are included in the middle layer. The middle layer also sometimes contains other materials that can blend with the recycled coated fabrics or other recycled post-consumer materials. The three layer coated fabric is manufactured by transforming the recycled coated fabrics and other materials into a form that can be used to create the middle layer.

Fabric substrates based on polyolefins are known in the art. WO 2006/109319 A1 relates to a process for manufacturing of protective covers comprising a polypropylene fabric coated or laminated with a thermoplastic polyolefin compound. However, the document is silent on recycling aspects.

The known polymer compositions comprising recycled materials are not suited for a high-end market and inter alia due to their mechanical properties they are not able to compete with virgin materials.

It was the objective of the present invention to overcome the disadvantages of the polymer composition according to the prior art. In particular, it was the object of the present invention to provide polymer compositions having good mechanical properties, like a high toughness, expressed by the Charpy Notched Impact Strength, and a good stiffness.

SUMMARY OF INVENTION

These objects have been solved by a polymer composition comprising the following components:

A) 5 to 35 wt.-% based on the overall weight of the polymer composition of a recycled coated polyolefin fabric substrate; wherein said fabric substrate is coated with a polyolefin composition comprising the following components:
    a1) an ethylene based plastomer with a density determined according to ISO 1183-1 in the range of 0.857 to 0.915 g/cm$^3$ and a MFR$_2$ (190° C., 2.16 kg)

determined according to ISO 1133 in the range of 0.5 to 30 g/10 min; and a2) a propylene based plastomer with a density determined according to ISO 1183-1 in the range of 0.850 to 0.910 g/cm$^3$ and a MFR$_2$ (230° C., 2.16 kg) determined according to ISO 1133 in the range of 0.01 to 30 g/10 min;

B) 65 to 95 wt.-% based on the overall weight of the polymer composition of a homopolypropylene or a recycled polymer blend comprising b1) polypropylene and b2) polyethylene, wherein the weight ratio of b1) to b2) is from 3:7 to 12:1;

with the proviso that components A) and B) add up to 100 wt.-%.

In particular, the polymer composition according to the present invention comprises:

A) 5 to 35 wt.-% based on the overall weight of the polymer composition comprising a recycled coated polyolefin fabric substrate which comprises a fabric substrate coated with a polyolefin coating composition comprising the following components:
  a1) an ethylene based plastomer with a density determined according to ISO 1183-1 in the range of 0.857 to 0.915 g/cm$^3$ and a MFR$_2$ (190° C., 2.16 kg) determined according to ISO 1133 in the range of 0.5 to 30 g/10 min; and
  a2) a propylene based plastomer with a density determined according to ISO 1183-1 in the range of 0.850 to 0.910 g/cm$^3$ and a MFR$_2$ (230° C., 2.16 kg) determined according to ISO 1133 in the range of 0.01 to 30 g/10 min;

B) 65 to 95 wt.-% based on the overall weight of the polymer composition of a homopolypropylene or a recycled polymer blend comprising b1) polypropylene and b2) polyethylene, wherein the weight ratio of b1) to b2) is from 3:7 to 12:1.

Surprisingly it was found that the specific combination of recycled coated polyolefin fabric substrate and component B) being a homopolypropylene or a recycled polymer blend allows to obtain a polymer composition has good mechanical properties.

It will be appreciated that components A and B cannot be the same.

Advantageous embodiments of the polymer composition in accordance with the present invention are specified in the dependent claims.

Viewed from another aspect the invention provides use of component A) being a recycled coated polyolefin fabric substrate; wherein said fabric substrate is coated with a polyolefin coating composition comprising the following components:
  a1) an ethylene based plastomer with a density with a density determined according to ISO 1183-1 in the range of 0.850 to 0.915 g/cm$^3$ and a MFR$_2$ (190° C., 2.16 kg) determined according to ISO 1133 in the range 0.5 to 30 g/10 min; and
  a2) a propylene based plastomer with a density determined according to ISO 1183-1 in the range of 0.860 to 0.910 g/cm$^3$ and a MFR$_2$ (230° C., 2.16 kg) determined according to ISO 1133 in the range of 0.5 to 30 g/10 min and preferably in the range of 0.01 to 30 g/10 min;
  for increasing the Charpy Notched Impact Strength measured according to ISO 179-1eA at 23° C.;
of component B) being a homopolypropylene or a recycled polymer blend comprising b1) polypropylene and b2) polyethylene, wherein the weight ratio of b1) to b2) is from 3:7 to 12:1;
whereby component B) is present in amount of 65 to 90 wt.-% and preferably 70 to 90 wt.-% based on the overall weight of components A) and B).

Component A) is preferably present in amount of 5 to 35 wt.-% based on the overall weight of components A) and B), such as 10 to 30 wt %.

Viewed from another aspect the invention provides an article comprising the polymer composition as herein before defined.

DETAILED DESCRIPTION OF INVENTION

Indications of Quantity

The polymer compositions in accordance with the present invention comprise the components A) and B) and optionally additives. In one embodiment, components A) and B) and if present the additives add up to 100 wt.-% in sum. In this embodiment, the fixed ranges of the indications of quantity for the individual components A) and B) and optionally the additives are to be understood such that an arbitrary quantity for each of the individual components can be selected within the specified ranges provided that the strict provision is satisfied that the sum of all the components A), B) and optionally the additives add up to 100 wt.-%.

In one embodiment, component A) according to the present invention comprises components a1), a2) and optionally component a3). In one embodiment, components a1), a2) and if present component a3) add up to 100 wt.-%. In this embodiment, the fixed ranges of the indications of quantity for the individual components a1), a2) and optionally a3) are to be understood such that an arbitrary quantity for each of the individual components can be selected within the specified ranges provided that the strict provision is satisfied that the sum of all the components a1), a2) and optionally a3) add up to 100 wt.-%.

For the purposes of the present description and of the subsequent claims, the term "recycled coated polyolefin fabric substrate" (=component A) is used to indicate that the material is recovered. In the gist of the present invention the "recycled coated polyolefin fabric substrate" may also comprise up to 10 wt.-%, preferably up to 5 wt.-%, more preferably up to 1 wt.-% and even more preferably up to 0.1 wt.-% based on the overall weight of the recycled coated polyolefin fabric substrate of other components originating from the first use. Type and amount of these components influence the physical properties of the recycled coated polyolefin fabric substrate. Typical other components originating from the first use are constituents of the lacquer, like polyurethanes.

For the purposes of the present description and of the subsequent claims, the term "recycled polymer blend" (=component B) is used to indicate that the material is recovered from post-consumer waste and/or industrial waste. Namely, post-consumer waste refers to objects having completed at least a first use cycle (or life cycle), i.e. having already served their first purpose and been through the hands of a consumer; while industrial waste refers to the manufacturing scrap which does normally not reach a consumer. In the gist of the present invention "recycled polymers" may also comprise up to 17 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

Typical other components originating from the first use of the "recycled polymer blend" are thermoplastic polymers, like polystyrene (PS) and polyamide 6 (PA 6), talc, chalk, ink, wood, paper, limonene and fatty acids. The content of polystyrene and PA 6 in "recycled polymer blends" can be determined by Fourier Transform Infrared Spectroscopy (FTIR) and the content of talc, chalk, wood and paper may be measured by Thermogravimetric Analysis (TGA).

The term "virgin" denotes the newly produced materials and/or objects prior to first use and not being recycled. In case that the origin of the materials is not explicitly mentioned the materials are "virgin" materials.

The term "ethylene based plastomer", as used herein, refers to a plastomer which comprises a majority amount of polymerized ethylene monomer (based on the weight of the plastomer) and, optionally, may contain at least one comonomer.

The term "propylene based plastomer", as used herein, refers to a plastomer which comprises a majority amount of polymerized propylene monomer (based on the weight of the plastomer) and, optionally, may contain at least one comonomer.

In the gist of the present invention a "polyolefin fabric substrate" is a fabric substrate which comprises a majority amount of polyolefins (based on the weight of the fabric substrate).

For the purposes of present description and claims a "non-woven" fabric is a fabric or like material that is made from fibres bonded together by chemical, mechanical, heat or solvent treatment. The term is used to denote fabrics, like felt, which are neither woven nor knitted.

For the purposes of the present invention a "flame retardant" is a substance which is activated by the presence of an ignition source and which prevents or slows the further development of ignition by a variety of different physical and chemical methods.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Component A)

Component A) of the polymer composition according to the present invention is a recycled coated polyolefin fabric substrate wherein the fabric substrate is coated with a specific polyolefin coating composition comprising the components specified below.

According to a preferred embodiment of the present invention the content of the coating composition is in the range of 5 to 90 wt.-%, preferably in the range of 50 to 85 wt.-%, more preferably in the range of 55 to 75 wt.-% and even more preferably in the range of 60 to 70 wt.-% based on the overall weight of component A).

According to a preferred embodiment of the present invention the content of the fabric substrate is in the range of 8 to 50 wt.-%, preferably in the range of 10 to 45 wt.-%, more preferably in the range of 20 to 35 wt.-% based on the overall weight of component A).

As explained above the polyolefin fabric substrate comprises a majority amount of polyolefins based on the weight of the fabric substrate, preferably the fabric substrate comprises polypropylene and more preferably the substrate consists of polypropylene.

Another embodiment of the present invention stipulates that the material used as starting for material for component A), e.g. the fabric substrate, is a nonwoven material. According to an alternative embodiment of the present invention the fabric substrate used as starting material for component A) is a woven material. Woven fabrics include knitted fabrics, in particular polypropylene knitted fabrics.

Besides the coating composition as defined herein and the polyolefin fabric substrate, the composition used as starting for material for component A) may be further coated with one or more additional materials, such as a lacquer (e.g. a polyurethane lacquer) to modify the surface properties of the polyolefin fabric substrate. According to a preferred embodiment of the present invention the content of the lacquer is below 15 wt.-%, preferably in the range of 0.2 to 5 wt.-% and more preferably in the range of 0.4 to 2 wt.-% based on the overall weight of component A).

In general, the coated polyolefin fabric substrate can be recycled by any mechanical recycling process known in the art to obtain component A). Preferably said process allows to obtain component A) in shredded form, as pellets, as flakes, as powder or as granules.

The data used in the experimental section of the present invention was generated based on compounded materials. The recycled material was shredded by using the Wittmann mill to get a dosable material for use in the compounds. As such, the shreds were dosed in the twin screw dosing system allowing an accurate control of the feeding amount of the shreds into the extruder.

Another preferred way for recycling the polyolefin fabric substrate is using the Erema Pure Loop system. In this system the fabrics as such (like sheets) are conveyed with a belt to a shredding chamber. The fabrics are then shredded into small pieces, followed by a direct feeding to the extruder for melting, homogeneising, filtering before being pelletized under water. Granules are collected and ready for further use, i.e. compounding.

Ethylene Based Plastomer

Component A) according to the present invention comprises an ethylene based plastomer a1). It is not only possible to use a single ethylene based plastomer, but it is also possible to use a mixture of two or more ethylene based plastomers as defined herein. In addition, the ethylene based plastomer may contain standard polymer additives.

Preferred embodiments of the ethylene based plastomer will be discussed in the following.

According to one preferred embodiment of the present invention, the ethylene based plastomer a1) is a copolymer of ethylene and at least one C3 to C10 alpha-olefin and preferably is a copolymer of ethylene and 1-octene.

Another preferred embodiment of the present invention stipulates that the ethylene based plastomer a1) has a density determined according to ISO 1183-1 in the range of 0.860 to 0.915 g/cm$^3$, preferably 0.865 to 0.905 g/cm$^3$ and/or a MFR$_2$ (190° C., 2.16 kg) determined according to ISO 1133 in the range of 2.5 to 12 g/10 min.

According to a further preferred embodiment of the present invention the content of component a1) in the coating composition of component A) is in the range of 40 to 65 wt.-%, preferably in the range of 45 to 62 wt.-% and more preferably in the range of 52 to 60 wt.-% based on the overall weight of the coating composition of component A).

In another preferred embodiment of the present invention the ethylene-based plastomer has an ethylene content in the range of 60 to 95 wt.-%, preferably in the range of 65 to 90 wt.-% and more preferably in the range of 70 to 88 wt.-%. The comonomer contribution preferably is up to 40 wt.-%, such as 5 to 40 wt %, more preferably up to 35 wt.-%.

According to still a further preferred embodiment of the present invention the melting point (measured with DSC according to ISO 11357-3:1999) of the ethylene based plastomer is below 130° C., preferably below 120° C., more preferably below 110° C. and most preferably below 100° C. A reasonable lower limit for the melting points of suitable ethylene based plastomers is 30° C. A typical melting point range is 33 to 115° C.

Another preferred embodiment of the present invention stipulates that the ethylene based plastomer has a glass transition temperature Tg (measured with DMTA according to ISO 6721-7) of below –40° C., preferably below –54° C., more preferably below –58° C.

In still another embodiment of the present invention the Mw/Mn value of the ethylene based plastomer, representing the broadness of the molecular weight distribution (MWD), is in the range of 1.5 to 5.0, preferably in the range of 2.0 to 4.5 and more preferably in the range of 2.5 to 4.0.

According to a further embodiment of the present invention the ethylene based plastomer is a metallocene catalysed polymer although Ziegler-Natta based ethylene based plastomers are also possible.

Suitable ethylene based plastomers are commercially available, for example from Borealis AG (AT) under the tradename Queo, from DOW Chemical Corp (USA) under the tradename Engage or Affinity, or from Mitsui under the tradename Tafmer.

Methods for manufacturing the ethylene based plastomers are inter alia described in WO2019/238943.

Propylene Based Plastomer

Component A) according to the present invention comprises a propylene based plastomer. It is not only possible to use a single propylene based plastomer, but it is also possible to use a mixture of two or more propylene based plastomers as defined herein. In addition, the propylene based plastomer may contain standard polymer additives.

One preferred embodiment of the present invention stipulates that the propylene based plastomer a2) is a copolymer of propylene and ethylene or a C4 to C10 alpha-olefin.

According to another preferred embodiment of the present invention the propylene based plastomer a2) has a density determined according to ISO 1183-1 in the range of 0.855 to 0.900 g/cm$^3$ and/or a MFR$_2$ (230° C., 2.16 kg) determined according to ISO 1133 in the range of 3.0 to 22 g/10 min.

In a preferred embodiment of the present invention the content of component a2) in the coating composition of component A) is in the range of 20 to 40 wt.-%, preferably in the range of 29 to 39 wt.-% and more preferably in the range of 30 to 34 wt.-% based on the overall weight of the coating composition of component A).

Another preferred embodiment of the present invention stipulates that the propylene based plastomer a2) is a copolymer of propylene and ethylene.

According to still a further preferred embodiment of the present invention the propylene based plastomer a2) has a density determined according to ISO 1183-1 in the range of 0.855 to g/cm$^3$ and a MFR$_2$ (230° C., 2.16 kg) determined according to ISO 1133 in the range of 3.0 to 22 g/10 min.

In a further preferred embodiment of the present invention propylene is present in component a2) in an amount of 55 to 95 wt.-%. If the comonomer is ethylene, the content of ethylene is preferably 5 to 30 wt.-%, such as 7.5 to 20 wt.-% in the propylene ethylene copolymer.

Still a further preferred embodiment of the present invention stipulates that the propylene based plastomer a2) has a molecular weight distribution (MWD), defined as weight average molecular weight divided by number average molecular weight (Mw/Mn) of 3.5 or less; or 3.0 or less; or from 1.8 to 3.0.

The weight average molecular weight (Mw) of the propylene based plastomers of this invention can vary widely, but typically it is between about 10,000 and 1,000,000 (with the understanding that the only limit on the minimum or the maximum Mw is that set by practical considerations).

Suitable propylene based plastomers of use in the invention are commercially available and can be bought from polymer suppliers. Examples include those available from The Dow Chemical Company, under the trade name VERSIFY, or from ExxonMobil Chemical Company, under the trade name VISTAMAXX.

Methods for manufacturing the ethylene based plastomers are inter alia described in WO2019238943.

Flame Retardant

Component A) according to the present invention may comprise a flame retardant a3). It is not only possible to use a single flame retardant, but it is also possible to use a mixture of two or more flame retardant as defined herein. Component a3) is ideally part of the coating composition.

According to a preferred embodiment of the present invention the flame retardant a3) is selected from the group consisting of boron phosphate flame retardants, magnesium oxide, dipentaerythritol, polytetrafluoroethylene (PTFE) polymers, phosphate ester flame retardants (e.g. Tricresyl phosphate); minerals such as aluminium hydroxide (ATH), magnesium hydroxide (MDH), huntite and hydromagnesite, antimony trioxide, alumina trihydrate, red phosphorus, boron compounds, e.g. borates, inorganic phosphinates, metal phosphinates such as salts of phosphinic acids and/or diphosphinic acids or polymeric derivatives thereof, organohalogen compounds such as organochlorines such as chlorendic acid derivatives and chlorinated paraffins, organobromines such as decabromodiphenyl ether (decaBDE), decabromodiphenyl ethane, polymeric brominated compounds such as brominated polystyrenes, brominated carbonate oligomers (BCGs), brominated epoxy oligomers (BEOs), decabromo diphenyl oxide, ethylene bis (tetrabromophthalimide), tetradecabromodiphenoxybenzene, ethylenebis (dibromonorbornanedi-carboximide), tetrabromophthalic anyhydride, tetrabromobisphenol A (TBBPA) and hexabromocyclododecane (HBCD); phosphate salt flame retardants such as metal salts of phosphoric acid, phosphorous acid, hypophosphorous acid, amine phosphate, melamine phosphate, dimelamine phosphate, melamine pyrophosphate, dimelamine pyrophosphate, ammonium polyphosphate, melamine polyphosphate, ethylenediamine phosphate, melamine nitrilotrisphosphonate or a combination thereof, organophosphorus compounds, in particular aromatic phosphates including monophosphates with aromatic groups, di phosphates with aromatic groups, triphosphates with aromatic groups and mixtures thereof.

Other organophosphates include triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl)phosphate (chlorinated tris or TDCPP) and tetrakis(2-chlorethyl)dichloroisopentyldiphosphate (V6).

Other known flame retardants which can be used include halogenated and/or melamine based flame retardants as well as those comprising ammonium polyphosphate.

Melamine derivatives include melamine polyphosphate, melamine pyrophosphate and melamine cyanurate, and mixtures of two or more of these materials. The halogenated flame retardants useful in the compositions of the present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates.

According to a preferred embodiment of the present invention the flame retardant is halogen-free.

Still another preferred embodiment of the present invention stipulates that the flame retardant a3) comprises an ammonium polyphosphate and more preferably consists of an ammonium polyphosphate.

According to a preferred embodiment of the present invention the content of component a3) in the coating composition of component A) is in the range of 5 to 20 wt.-%, preferably in the range of 9 to 16 wt.-% and more preferably in the range of 10 to 14 wt.-% based on the overall weight of the coating composition of component A).

The flame retardant may be added neat or as part of a polymer masterbatch. A polymer masterbatch may contain the flame retardant in a concentration of, for example 2.5 wt.-% to wt.-%.

According to a preferred embodiment of the present invention the flame retardant comprises a mixture of an ammonium polyphosphate and a silane functionalised ethylene copolymer. Ammonium polyphosphates are stable, non-volatile compounds and are commercially available and can be bought from many suppliers. Examples include the ADK STAB FP-2000 series of flame retardants available from Adeka Polymer Additive Europe or IC FR5110 available from Into Chemicals.

The silane functionalised ethylene copolymer is an ethylene copolymer comprising silane group(s) containing units. The silane group(s) containing units can be present as a comonomer of the ethylene copolymer or as a compound grafted chemically to the polymer.

Component B)

Component B) in accordance with the present invention is a homopolypropylene or a recycled polymer blend comprising b1) polypropylene and b2) polyethylene, wherein the weight ratio of b1) to b2) is from 3:7 to 12:1.

According to a preferred embodiment of the present component B) is a homopolypropylene having a $MFR_2$ (230° C., 2.16 kg) determined according to ISO 1133 in the range of 10 to 30 g/10 min, preferably 15 to 25 g/10 min and more preferably in the range of 18 to 22 g/10 min.

Another preferred embodiment of the present invention stipulates that component B) is a homopolypropylene, which has a melting point determined according to 10 11357-3 in the range of 158 to 163° C. and preferably in the range of 160 to 162° C.

Preferred homopolypropylenes are commercially available from Borealis AG (Austria) under the trade names HE370FB, HG475FB, HH450FB and HF420FB.

Still another preferred embodiment of the present invention stipulates that component B) is a recycled polymer blend comprising b1) polypropylene and b2) polyethylene, wherein the weight ratio of b1) to b2) is from 3:7 to 12:1.

According to a further preferred embodiment in accordance with the present invention component B) is a recycled polymer blend comprising 80.0 to 99.9 wt.-%, preferably 90.0 to 99.0 wt.-% and more preferably 94.0 to 98.0 wt.-% based on the overall weight of component B) of polypropylene b1) and polyethylene b2).

In a further preferred embodiment of the present invention component B) is a recycled polymer blend, comprising less than 5 wt.-%, preferably less than 3 wt.-% and more preferably from 0.01 to 2 wt.-% based on the overall weight of component B) of thermoplastic polymers different from b1) and b2).

Still another preferred embodiment of the present invention stipulates that component B) is a recycled polymer blend, comprising less than 4.0 wt.-% PA 6 and less than 5 wt.-% polystyrene and more preferably component B) comprises 0.5 to 3 wt.-% polystyrene.

According to another preferred embodiment in accordance with the present invention component B) is a recycled polymer blend recovered from waste plastic material derived from post-consumer and/or post-industrial waste.

In another preferred embodiment according to the present invention component B) is a recycled polymer blend having a $MFR_2$ (230° C., 2.16 kg) determined according to ISO 1133 in the range of 16 to 50 g/10 min and preferably in the range of 18 to 22 g/10 min.

The recycled polymer blend preferably originates from post-consumer and/or post-industrial waste, which can be derived from inter alia waste electrical and electronic equipment (VVEEE) or end-of-life vehicles (ELV) or from differentiated waste collection schemes like the German DSD system, the Austrian ARA system and the Austrian ASZ system (especially for Purpolen materials) or the Italian "Raccolta Differenziata" system.

Recycled materials are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Ecoplast (AT), Vogt Plastik GmbH (DE), mtm plastics GmbH (DE) etc.

A preferred recycled polymer blend is Purpolen PP, being a recycled polymer mixture comprising polyethylene and polypropylene obtained from mtm plastics GmbH, Niedergebra, Germany.

Additives

The polymer composition according to the present invention may also comprise additives.

According to one preferred embodiment of the present invention the polymer composition comprises at least one additive, preferably selected from the group consisting of slip agents, anti-acids, antimicrobial agents, UV-stabilisers, pigments, antioxidants, antiblock agents, additive carriers, nucleating agents, lubricants, processing aids, silicon-based anti-scratch agents and mixtures thereof. These additives are preferably present in 0.1 to 10 wt.-% and more preferably in 0.5 to 3 wt.-% based on the overall weight of the polymer composition.

Polymer Composition

Below preferred embodiments of the polymer composition according to the present invention will be discussed.

In a preferred embodiment of the present invention the content of component A) in the polymer composition is in the range of 9 to 31 wt.-%, preferably in the range of 10 to 20 wt.-% and more preferably in the range of 19 to 31 wt.-% based on the overall weight of the polymer composition.

According to another embodiment of the present invention the content of component B) in the polymer composition is in the range of 69 to 91 wt.-%, preferably in the range of 80 to 90 wt.-% and more preferably based in the range of 69 to 81 wt.-% based on the overall weight of the polymer composition.

A preferred polymer composition according to the present invention comprises the following components:
  A) 5 to 35 wt.-% based on the overall weight of the polymer composition of a recycled coated polyolefin fabric substrate; wherein said fabric substrate is coated with a polyolefin coating composition comprising the following components:
    a1) an ethylene based plastomer with a density determined according to ISO 1183-1 in the range of 0.860 to 0.915 g/cm$^3$ and a $MFR_2$ (190° C., 2.16 kg) determined according to ISO 1133 in the range of 0.5 to 30 g/10 min;
    a2) a propylene based plastomer with a density determined according to ISO 1183-1 in the range of 0.850 to 0.910 g/cm$^3$ and a $MFR_2$ (230° C., 2.16 kg) determined according to ISO 1133 in the range of 0.01 to 30 g/10 min; and
    a3) a flame retardant, preferably an ammonium polyphosphate;
  B) 65 to 95 wt.-% based on the overall weight of the polymer composition of a homopolypropylene or a recycled polymer blend comprising b1) polypropylene and b2) polyethylene, wherein the weight ratio of b1) to b2) is from 3:7 to 12:1.

In one embodiment, components A) and B) add up to 100 wt.-%.

In one embodiment, components a1), a2) and a3) of component A) add up to 100 wt.-%.

Another preferred polymer composition according to the present invention comprises the following components:
  A) 9 to 31 wt.-%, preferably 19 to 31 wt.-% based on the overall weight of the polymer composition of a recycled coated polyolefin fabric substrate; wherein said fabric substrate is coated with a polyolefin coating composition comprising the following components:
    a1) 40 to 65 wt.-%, preferably 45 to 62 wt.-% and more preferably 52 to 60 wt.-% based on the overall weight of the coating composition of an ethylene based plastomer with a density determined according to ISO 1183-1 in the range of 0.865 to 0.905 g/cm$^3$ and a $MFR_2$ (190° C., 2.16 kg) determined according to ISO 1133 in the range of 2.5 to 12 g/10 min;
    a2) 20 to 40 wt.-%, preferably 29 to 39 wt.-%, more preferably 30 to 34 wt.-% based on the overall weight of the coating composition of a propylene based plastomer with a density determined according to ISO 1183-1 in the range of 0.855 to 0.900 g/cm$^3$ and a $MFR_2$ (230° C., 2.16 kg) determined according to ISO 1133 in the range of 3 to 22 g/10 min; and
    a3) 5 to 20 wt.-%, preferably 9 to 16 wt.-% and more preferably 10 to 14 wt.-% based on the overall weight of the coating composition of a flame retardant, preferably an ammonium polyphosphate;
  B) 69 to 91 wt.-%, preferably 69 to 81 wt.-% based on the overall weight of the polymer composition of a homopolypropylene or a recycled polymer blend comprising b1) polypropylene and b2) polyethylene, wherein the weight ratio of b1) to b2) is from 3:7 to 12:1.

The composition of the invention may be prepared by any suitable method. Ideally, a method is used which produces a homogenous mixture of the various components. Typically, compounding is employed. Compounding usually involves mixing or/and blending the various components in a molten state, often by extrusion.

In one embodiment, the polymer composition is prepared by obtaining a recycled coated polyolefin fabric substrate as herein defined and shredding the same to form shreds; combining, optionally in an extruder,
  A) 5 to 35 wt.-% based on the overall weight of the polymer composition of said shreds of recycled coated polyolefin fabric substrate; wherein said fabric substrate is coated with a polyolefin coating composition comprising the following components:
    a1) an ethylene based plastomer with a density determined according to ISO 1183-1 in the range of 0.857 to 0.915 g/cm$^3$ and a $MFR_2$ (190° C., 2.16 kg) determined according to ISO 1133 in the range of 0.5 to 30 g/10 min; and
    a2) a propylene based plastomer with a density determined according to ISO 1183-1 in the range of 0.850 to 0.910 g/cm$^3$ and a $MFR_2$ (230° C., 2.16 kg) determined according to ISO 1133 in the range of 0.01 to 30 g/10 min; and
  B) 65 to 95 wt.-% based on the overall weight of the polymer composition of a homopolypropylene or a recycled polymer blend comprising b1) polypropylene and b2) polyethylene, wherein the weight ratio of b1) to b2) is from 3:7 to 12:1.

In one embodiment, the shreds can be extruded and pelletized before combination with the component B). In one embodiment, the polymer composition of the invention can be pelletised in the extruder.

In one embodiment, the recycled polymer blend B) is obtained from waste plastic material derived from post-consumer and/or post-industrial waste.

Use of Component A)

The present invention also relates to the use of component A) being a recycled coated polyolefin fabric substrate, wherein said fabric substrate is coated with a polyolefin coating composition comprising the following components:
  a1) an ethylene based plastomer with a density with a density determined according to ISO 1183-1 in the range of 0.850 to 0.915 g/cm$^3$ and a $MFR_2$ (190° C., 2.16 kg) determined according to ISO 1133 in the range 0.5 to 30 g/10 min; and
  a2) a propylene based plastomer with a density determined according to ISO 1183-1 in the range of 0.860 to 0.910 g/cm$^3$ and a $MFR_2$ (230° C., 2.16 kg) determined according to ISO 1133 in the range of 0.01 to 30 g/10 min and preferably in the range of 0.5 to 30 g/10 min;
for increasing the Charpy Notched Impact Strength measured according to ISO 179-1eA at 23° C.;
of component B) being a homopolypropylene or a recycled polymer blend comprising b1) polypropylene and b2) polyethylene, wherein the weight ratio of b1) to b2) is from 3:7 to 12:1; whereby component B) is present in amount of 65 to 90 wt.-% and preferably 40 to 60 wt.-% based on the overall weight of components A) and B).

According to a preferred embodiment according to the present invention component B) is homopolypropylene and the Charpy Notched Impact Strength of component B)

measured according to ISO 179-1eA at 23° C. is increased by at least 25% and preferably by 25 to 150%.

Still another preferred embodiment of the present invention stipulates that component B) is a recycled polymer blend comprising b1) polypropylene and b2) polyethylene, wherein the weight ratio of b1) to b2) is from 3:7 to 12:1 and the Charpy Notched Impact Strength of component B) measured according to ISO 179-1eA at 23° C. is increased, preferably by at least % and more preferably by 10 to 100%.

According to another preferred embodiment in accordance with the present invention component B) is a recycled polymer blend comprising b1) polypropylene and b2) polyethylene, wherein the weight ratio of b1) to b2) is from 3:7 to 12:1 and the Tensile Strain at Break measured according to ISO 527-2 is increased, preferably by at least 20% and more preferably by 20 to 250%.

Still another preferred embodiment of the present invention stipulates that component A) comprises a flame retardant a3) comprising an ammonium polyphosphate and preferably consisting of an ammonium polyphosphate.

All preferred aspects and embodiments as described above shall also hold for the use according to the present invention.

Article

The present invention also relates to an article comprising the polymer composition in accordance with the present invention.

According to a preferred embodiment of the present invention the article is selected from the group consisting of consumer goods or houseware, preferably caps, closures and packaging containers, boxes, cutlery tray, garbage bin.

The invention will now be described with reference to the following non-limiting examples and FIGURES.

EXPERIMENTAL PART

A. Measuring Methods

Figure 1A:
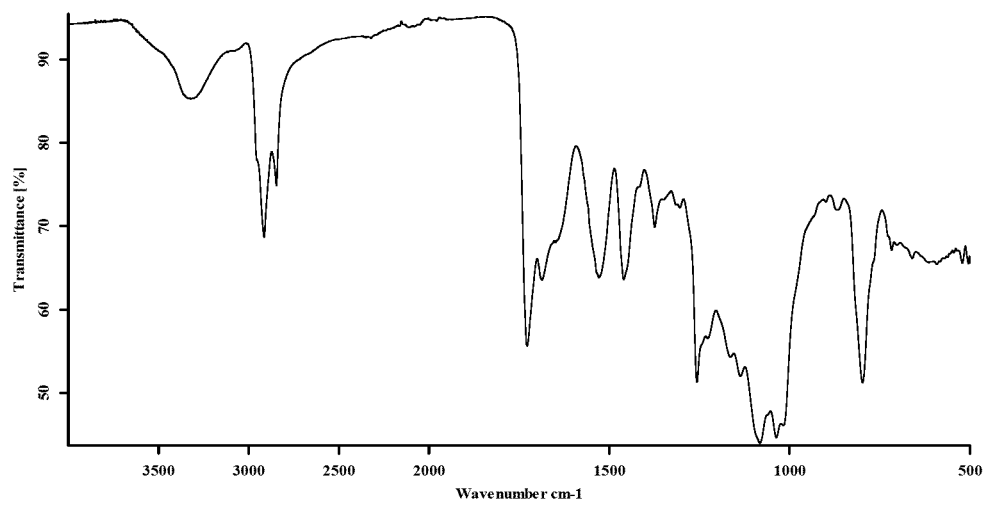
FIGS. 1a-c, 2a-c and 3a-c show the FTIRs for blue, white and black recycled coated polyolefin fabric substrate.

The following definitions of terms and determination methods apply for the above general description of the invention as well as to the below examples unless otherwise defined.

Melt Flow Rate

The melt flow rate (MFR) was determined according to ISO 1133—Determination of the melt mass-flow rate (MFR) and melt volume-flow rate (MVR) of thermoplastics—Part 1: Standard method and is indicated in g/10 min. The MFR is an indication of the flowability, and hence the processability, of the polymer. The higher the melt flow rate, the lower the viscosity of the polymer. The $MFR_2$ of polyethylene-based plastomers is determined at a temperature of 190° C. and a load of 2.16 kg. The $MFR_2$ of polypropylene-based plastomers is determined at a temperature of 230° C. and a load of 2.16 kg.

Density

Density of the materials was measured according to ISO 1183-1. Sample preparation is done by compression moulding in accordance with ISO 1872-2.

Tensile Modulus, Tensile Strength, Tensile Strain at Break, Tensile Strain at Tensile Strength, Tensile Stress at Break The measurements were conducted after 96 h conditioning time (at 23° C. at 50% relative humidity) of the test specimen. The test specimen were prepared according to ISO 294-1.

Tensile Modulus was measured according to ISO 527-2 (cross head speed=1 mm/min; 23° C.).

Tensile Strength was measured according to ISO 527-2 (cross head speed=50 mm/min; 23° C.).

Tensile Strain at Break was measured according to ISO 527-2 (cross head speed=50 mm/min; 23° C.).

Tensile Strain at Tensile Strength was determined according to ISO 527-2 with an elongation rate of 50 mm/min until the specimen broke.

Tensile Stress at Break was determined according to ISO 527-2 (cross head speed=50 mm/min).

Tensile Stress at Yield was determined according to ISO 527-2 (cross head speed=50 mm/min).

Charpy Notched Impact Strength

Charpy Notched impact strength was determined (after 96 hours of conditioning at 23° C. and % relative humidity) according to ISO 179 1eA at 23° C. and −20° C. using 80×10×4 $mm^3$ test bars injection moulded in line with EN ISO 1873-2.

Determination of the Content of Isotactic Polypropylene (iPP), Polystyrene (PS), Ethylene and Polyamide-6 in Purpolen Calibration standards were prepared by blending iPP and HDPE to create a calibration curve. The thickness of the films of the calibration standards were 300 μm. For the quantification of the iPP, PS and PA 6 content in the samples quantitative IR spectra were recorded in the solid-state using a Bruker Vertex 70 FTIR spectrometer. Spectra were recorded on 25×25 mm square films of 50-100 μm thickness prepared by compression moulding at 190° C. and 4 to 6 mPa. Standard transmission FTIR spectroscopy was employed using a spectral range of 4000 to 400 $cm^{-1}$, an aperture of 6 mm, a spectral resolution of 2 $cm^{-1}$, 16 background scans, 16 spectrum scans, an interferogram zero filling factor of 32 and Norton Beer strong apodisation.

The absorption of the band at 1167 $cm^{-1}$ in iPP was measured and the iPP content was quantified according to a calibration curve (absorption/thickness in cm versus iPP content in wt.-%).

The absorption of the band at 1601 $cm^{-1}$ (PS) and 3300 $cm^{-1}$ (PA6) were measured and the PS- and PA6 content quantified according to the calibration curve (absorption/thickness in cm versus PS and PA content in wt.-%). The content of ethylene was obtained by subtracting the content of iPP, PS and PA6 from 100. The analysis was performed as double determination.

B. Materials Used

Component A): Recycled Coated Polyolefin Fabric Substrate Component

Recycled coated polyolefin fabric substrates in sheet form were shredded by using a Wittmann mill at ambient temperature into small pieces which are about the same size of a standard polymer pellet. The used polyolefin fabric substrate is a PP-based knitted fabric having on top 2 thin layers (thickness approx. 0.09 mm and 0.4 mm), each comprising the coating composition as defined in Table 1, as well as lacquers in the amounts as specified below. The lacquers are consisting of other non-polyolefin based resins, mainly polyurethane and polyacrylate.

Figure 1B:
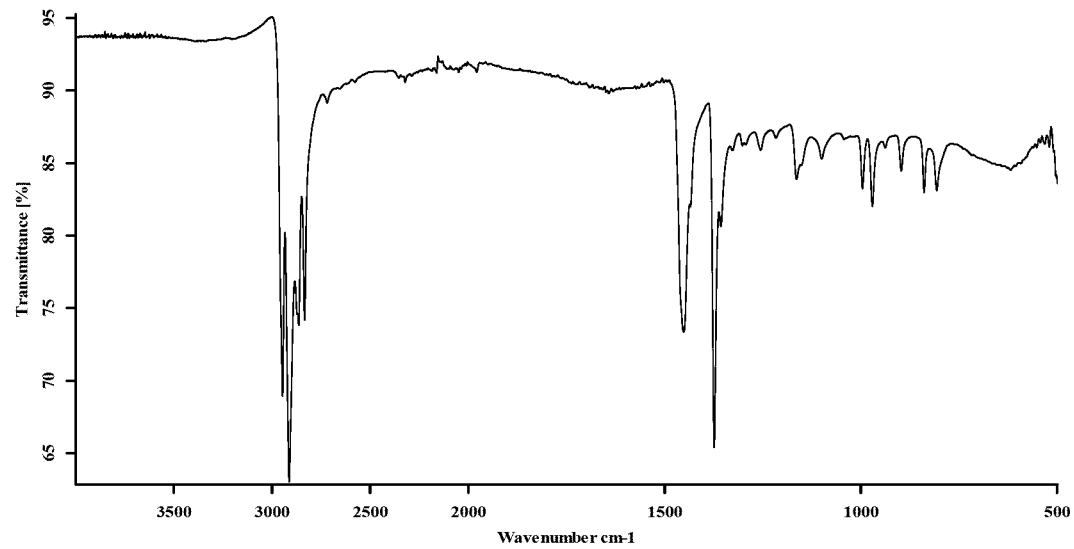
Figure 1C:
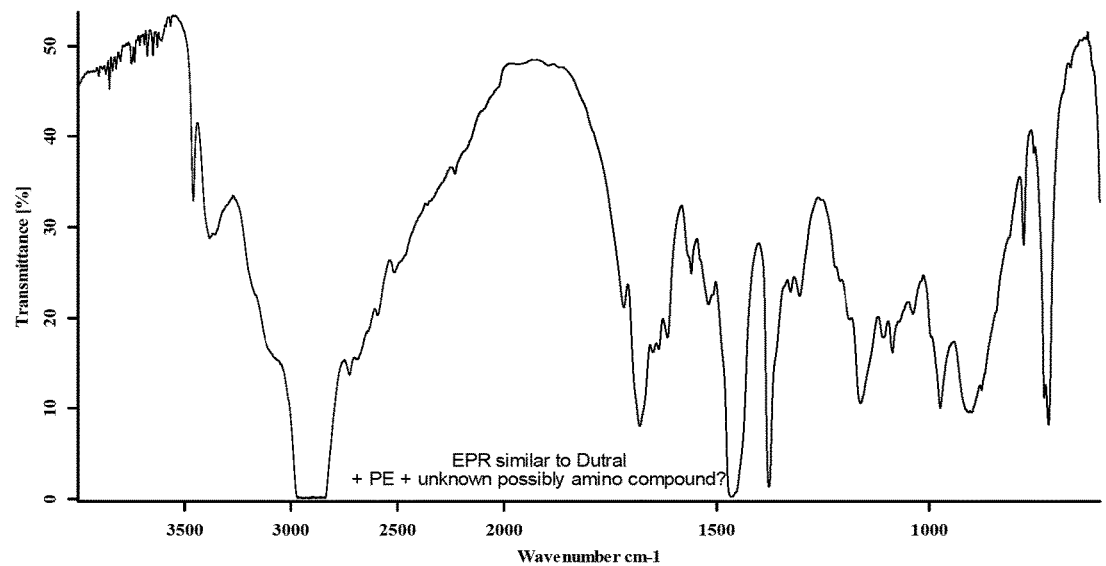
Figure 2A:
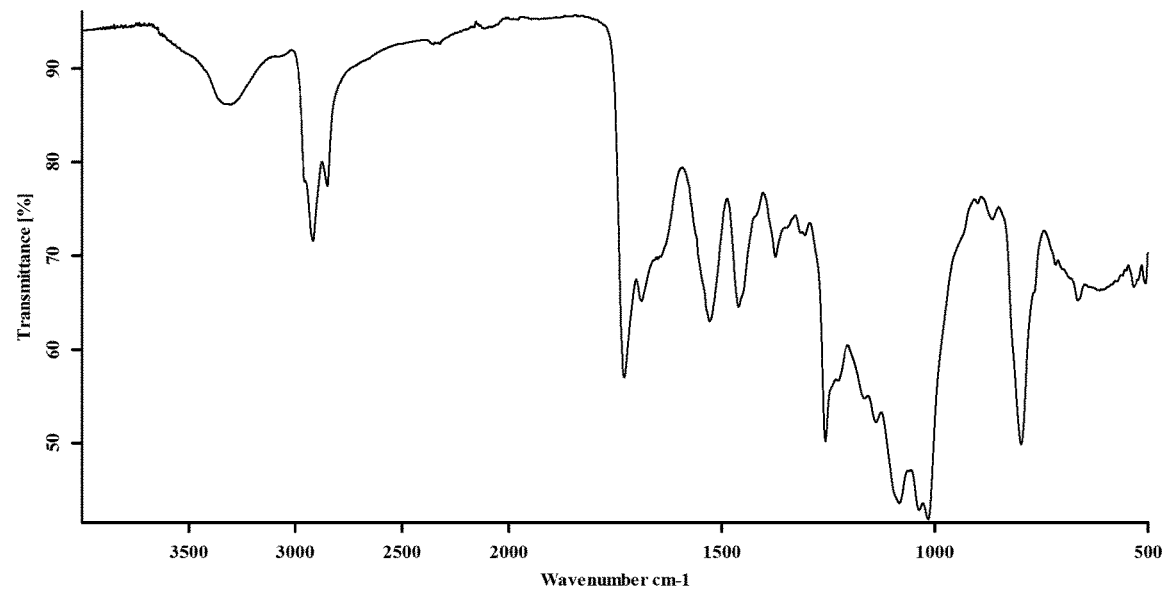
Figure 2B:
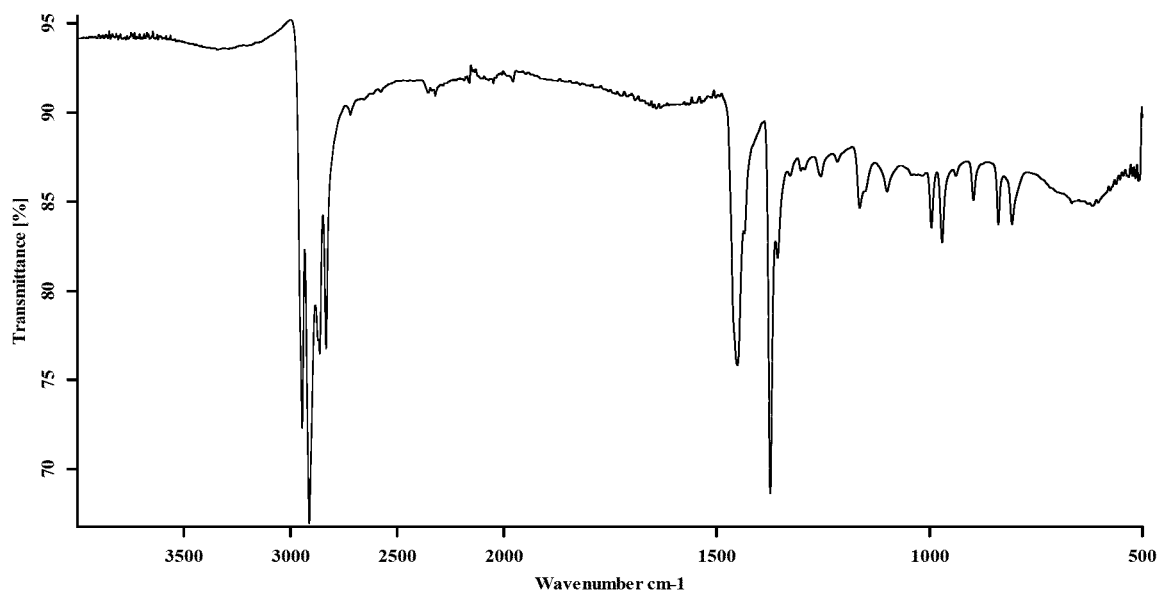
Figure 2C:
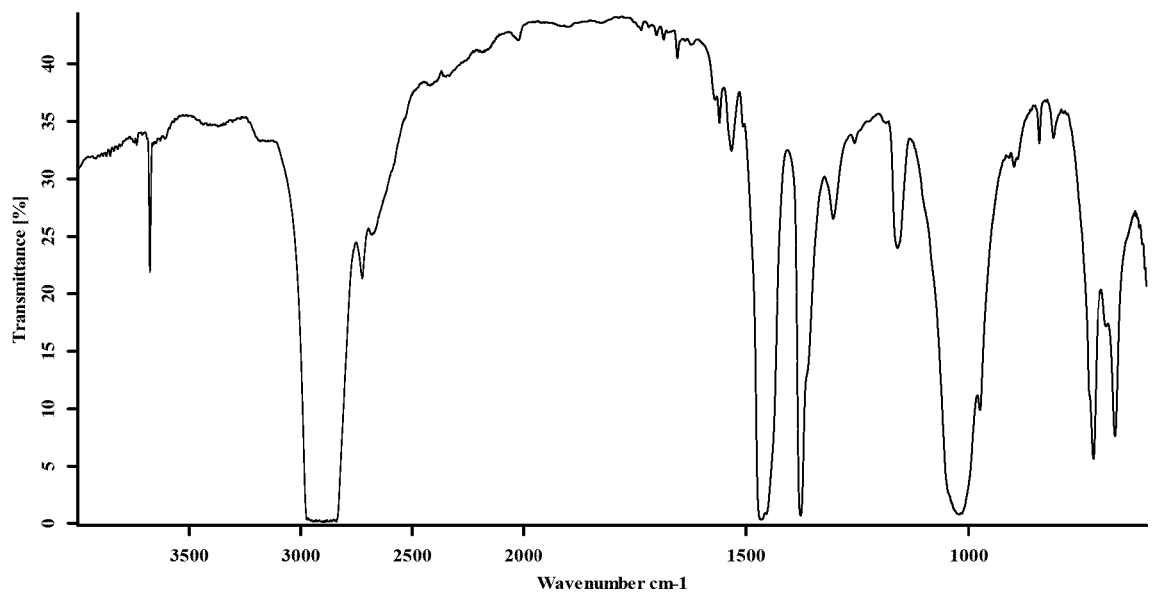
Figure 3A:
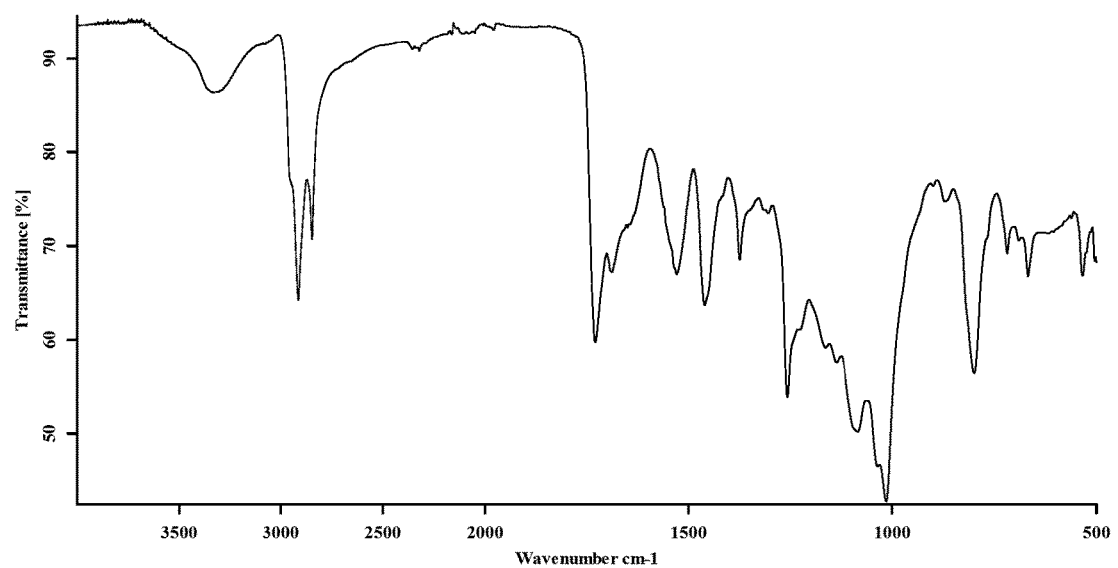
Figure 3B:
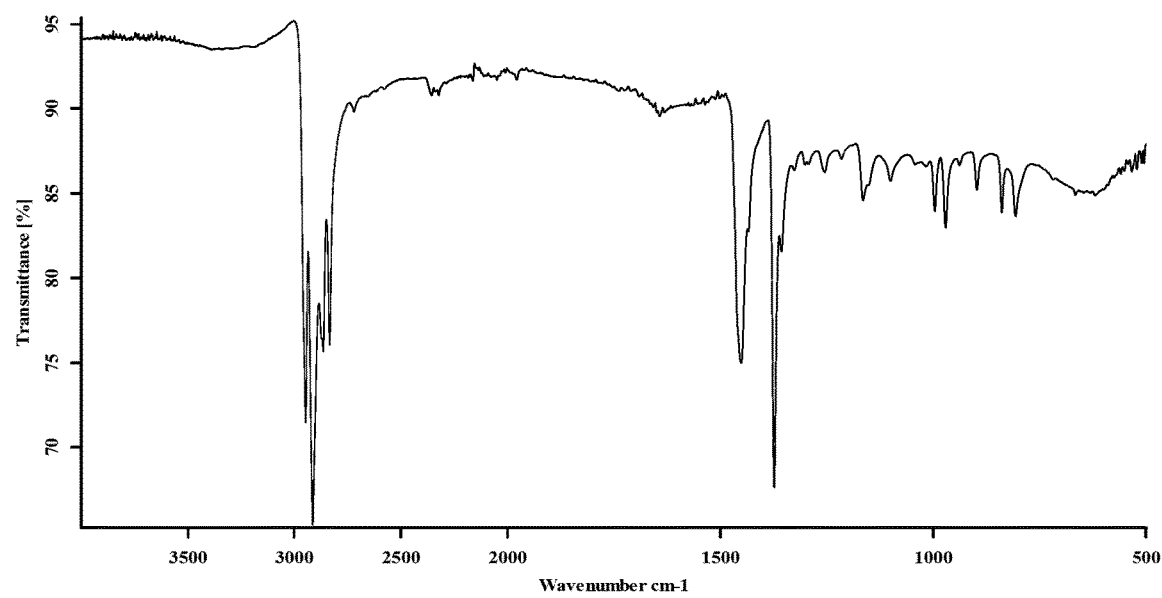
Figure 3C:
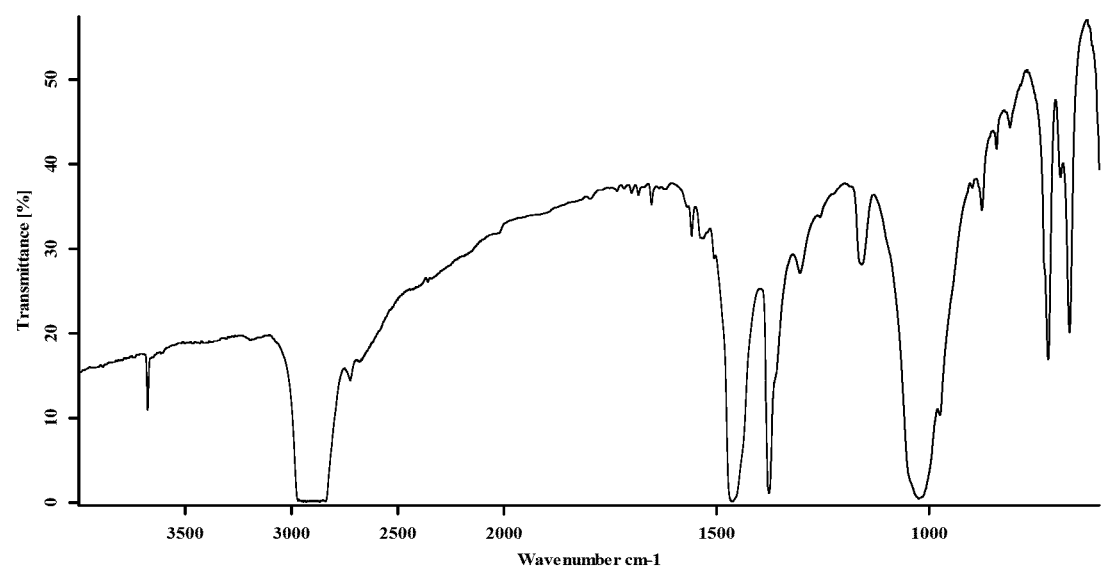

Recycled coated polyolefin fabric substrates were subjected to analysis via FTIR. FTIR analysis of three recycled coated polyolefin fabric substrates (the same other than in colour) showed that all 3 samples are 3-layer structures comprising:

Urethane and/or silicon based resins in the lacquer layer
EPR, PE plastomer in the coating layer
PP-homopolymer in the fabric substrate FIGS. 1a-c, 2a-c and 3a-c show the FTIRs for blue, white and black recycled coated polyolefin fabric substrate.

Lacquer: 5.0 wt.-% based on the total weight of the coated polyolefin fabric substrate Coating composition: 65 wt.-% based on the total weight of the coated polyolefin fabric substrate Polypropylene fabric: 30 wt.-% based on the total weight of the coated polyolefin fabric substrate (thickness: 0.5 mm)

TABLE 1

Composition of the coating of the recycled polyolefin fabric substrate.

| Content [wt.-%] | Description | Tradename/ Supplier |
|---|---|---|
| 45.8 | Ethylene based plastomer: an ethylene octene metallocene plastomer, density = 0.870 g/cm³, MFR₂ (190° C./2.16 kg) = 6.6 g/10 min (=component a1) | Queo 7007LA/ Borealis AG |
| 11.0 | Ethylene based plastomer: an ethylene octene metallocene plastomer, density = 0.902 g/cm³, MFR₂ (190° C./2.16 kg) = 3 g/10 min (=component a1) | Queo 0203/ Borealis AG |
| 31.45 | Random propylene ethylene metallocene plastomer, density = 0.862 g/cm³, MFR₂ (230° C., 2.16 kg) = 20 g/10 min (=component a2) | Vistamaxx 6202/ Exxon Mobile |
| 11.0 | Ammonium polyphosphate (flame retardant = component a3) | ADKSTAB FP2500S/ ADEKA Polymer Additives Europe |
| 0.75 | Stabilizer mixture comprising UV-stabilizers and antioxidants | — |

Component B)
Recycled Polymer Blend (Purpolen PP)

Purpolen PP is a recycled polymer mixture comprising as main components polyethylene and polypropylene obtained from mtm plastics GmbH, Niedergebra (Germany).

TABLE 2

Composition of the recycled polymer blend.

| | content of component b1) determined by FTIR (PP) | content of of component b2) determined by FTIR (PE) |
|---|---|---|
| Purpolen | 87.4 wt.-% | 10.5 wt.-% |

Purpolen adds up with PS and PA 6 (content also determined by FTIR) to 100 wt.-%.

Virgin Homopolypropylene (HF420FB)

HF420FB: HF420FB is a polypropylene homopolymer, commercially available by Borealis AG (Austria), Melt Flow Rate (230° C./2.16 kg, ISO 1133) of 19.0 g/10 min and melting temperature (determined by DSC according to ISO 11357/03) of 1161° C.

C. Manufacturing of the Polymer Composition

The polymer compositions according to the Inventive Examples 1E1 to 1E6 were manufactured by feeding component A) into a co-rotating twin screw side feeder (extruder prism TSE 24MC) which allowed an accurate feeding and dosing of the material into the extruder. Component B) was fed in the form of granules into the same extruder via the main hopper. In the extruder components A) and B) were melt blended (230° C., output rate 6 kg/hour) and subsequently pelletized by an underwater cooling system. The obtained pellets were collected, dried and submitted tested. The materials according to CE1 and CE3 were not compounded. The amounts of the different components in the polymer compositions and the properties of the polymer compositions according to the inventive examples and the comparative examples can be gathered from below Tables 3 and 4.

TABLE 3

Composition and properties of the polymer compositions comprising a virgin homopolypropylene.

| | Unit | IE1 | IE2 | IE3 | CE1 | CE2 |
|---|---|---|---|---|---|---|
| Component | | | | | | |
| Recycled coated polyolefin fabric substrate (A) | wt.-% | 10 | 20 | 30 | — | 100 |
| HF420B (B) | wt.-% | 90 | 80 | 70 | 100 | — |
| Properties | | | | | | |
| MFR₂ | g/10 min | 19.4 | 19.0 | 18.8 | 19.5 | n.d. |
| Tensile Modulus | MPa | 1170 | 1020 | 948 | 1270 | 266 |
| Tensile Stress at Yield | MPa | 29.3 | 25.6 | 23.8 | 31.6 | n.d. |
| Tensile Strength | MPa | 29.3 | 25.6 | 23.8 | 31.6 | 9.3 |
| Tensile Strain at Tensile Strength | % | 11.2 | 12.0 | 13.2 | 10.7 | 358 |
| Tensile Stress at Break | MPa | 13.4 | n.d. | n.d. | 17.4 | 9.1 |
| Tensile Strain at Break | % | 616 | n.d. | n.d. | 628 | 360 |
| Charpy Notched Impact Strength 23° C. | kJ/m² | 3.6 | 4.3 | 5.2 | 2.3 | n.d. | n.d. = not determined.

TABLE 4

Composition and properties of the polymer compositions comprising a recycled polymer blend.

| Component | Unit | IE4 | IE5 | IE6 | CE3 |
|---|---|---|---|---|---|
| Recycled coated polyolefin fabric substrate (A) | wt.-% | 10 | 20 | 30 | 100 |
| Purpolen PP (B) | wt.-% | 90 | 80 | 70 | — |
| Properties | | | | | |
| $MFR_2$ | g/10 min | 22.6 | 22.2 | 21.3 | 24.0 |
| Tensile Modulus | MPa | 1094 | 962 | 834 | 1268 |
| Tensile Stress at Yield | MPa | 22.5 | 20.6 | 18.7 | 25.0 |
| Tensile Strength | MPa | 22.5 | 20.6 | 18.7 | 25.0 |
| Tensile Strain at Tensile Strength | % | 5.8 | 7.4 | 10.2 | 5.0 |
| Tensile Stress at Break | MPa | 17.1 | 12.7 | 12.3 | 20.3 |
| Tensile Strain at Break | % | 18.2 | 26.9 | 46.1 | 14.1 |
| Charpy Notched Impact Strength 23° C. | $kJ/m^2$ | 6.6 | 8.3 | 10.0 | 5.3 |

D Discussion of the Results

As can be seen from Table 3 the addition of a recycled polyolefin fabric substrate to a virgin polypropylene significantly improves the toughness, expressed by the Charpy Notched Impact Strength at 23° C., of the polymer composition while the stiffness of the material is still at a good level. The experimental data according to Table 4 confirm that said technical effect is also observed in recycled polymer blends. In addition, the presence of a recycled polyolefin fabric substrate in a recycled polymer blend also significantly improves the Tensile Strain at Break of the polymer composition.

The invention claimed is:

1. A polymer composition comprising the following components:
   A) 5 to 35 wt.-% based on the overall weight of the polymer composition of a recycled coated polyolefin fabric substrate; wherein said fabric substrate is coated with a polyolefin coating composition comprising the following components:
      a1) an ethylene based plastomer with a density determined according to ISO 1183-1 in the range of 0.857 to 0.915 g/cm³ and a $MFR_2$ (190° C., 2.16 kg) determined according to ISO 1133 in the range of 0.5 to 30 g/10 min; and
      a2) a propylene based plastomer with a density determined according to ISO 1183-1 in the range of 0.850 to 0.910 g/cm³ and a $MFR_2$ (230° C., 2.16 kg) determined according to ISO 1133 in the range of 0.01 to 30 g/10 min;
   B) 65 to 95 wt.-% based on the overall weight of the polymer composition of a homopolypropylene or a recycled polymer blend comprising b1) polypropylene and b2) polyethylene, wherein the weight ratio of b1) to b2) is from 3:7 to 12:1.

2. The polymer composition according to claim 1, wherein the content of the coating composition in component A) is in the range of 5 to 90 wt.-%, based on the overall weight of component A).

3. The polymer composition according to claim 1, characterized in that:
   the ethylene based plastomer a1) is a copolymer of ethylene and at least one C3 to C10 alpha-olefin;
   the propylene based plastomer a2) is a copolymer of propylene and ethylene or a C4 to C10 alpha-olefin;
   or a combination thereof.

4. The polymer composition according to claim 1, characterized in that:
   the ethylene based plastomer a1) has a density determined according to ISO 1183-1 in the range of 0.860 to 0.915 g/cm³, and/or a $MFR_2$ (190° C., 2.16 kg) determined according to ISO 1133 in the range of 2.5 to 12 g/10 min;
   the propylene based plastomer a2) has a density determined according to ISO 1183-1 in the range of 0.855 to 0.900 g/cm³ and/or a $MFR_2$ (230° C., 2.16 kg) determined according to ISO 1133 in the range of 3.0 to 22 g/10 min;
   or a combination thereof.

5. The polymer composition according to claim 1, characterized in that component A) further comprises a flame retardant a3).

6. The polymer composition according to claim 5, characterized in that:
   the content of component a1) in the coating composition of component A) is in the range of 40 to 65 wt.-% based on the overall weight of component A);
   the content of component a2) in the coating composition of component A) is in the range of 20 to 40 wt.-% based on the overall weight of component A);
   the content of component a3) in the coating composition of component A) is in the range of 5 to 20 wt.-% based on the overall weight of component A);
   or a combination thereof.

7. The polymer composition according to claim 1, characterized in that:
   the content of component A) in the polymer composition is in the range of 9 to 31 wt.-% based on the overall weight of the polymer composition;
   the content of component B) in the polymer composition is in the range of 69 to 91 wt.-% based on the overall weight of the polymer composition;
   or a combination thereof.

8. The polymer composition according to claim 1, characterized in that the polymer composition further comprises at least one additive present in an amount of from 0.1 to 10 wt.-% based on the overall weight of the polymer composition.

9. The polymer composition according to claim 1, characterized in that component B) is a homopolypropylene having:
   a $MFR_2$ (230° C., 2.16 kg) determined according to ISO 1133 in the range of 10 to 30 g/10 min;
   a melting point determined according to IO 11357-3 in the range of 158 to 163° C.;
   or a combination thereof.

10. The polymer composition according to claim 1, characterized in that component B) is a recycled polymer blend comprising b1) polypropylene and b2) polyethylene, wherein the weight ratio of b1) to b2) is from 3:7 to 12:1; and wherein component (B) comprises 80.0 to 99.9 wt.-% based on the overall weight of component B) of polypropylene b1) and polyethylene b2).

11. The polymer composition according to claim 1, characterized in that component B) comprises less than 5 wt.-% based on the overall weight of component B) of thermoplastic polymers different from b1) and b2).

12. The polymer composition according to claim 1, characterized in that component B) is recovered from waste plastic material derived from post-consumer and/or post-industrial waste.

13. The polymer composition according to claim 1, characterized in that the $MFR_2$ (230° C., 2.16 kg) determined according to ISO 1133 of component B) is in the range of 16 to 50 g/10 min.

14. The polymer composition according to claim 1, wherein the fabric substrate comprises polypropylene.

15. The polymer composition according to claim 1, wherein the content of the fabric substrate is in the range of 8 to 50 wt.-% based on the overall weight of component A).

16. A process for the preparation of the polymer composition of claim 1, the process comprising:
   obtaining a recycled coated polyolefin fabric substrate, wherein said fabric substrate is coated with a polyolefin coating composition comprising the following components:
   a1) the ethylene based plastomer with a density determined according to ISO 1183-1 in the range of 0.857 to 0.915 g/cm³ and a $MFR_2$ (190° C., 2.16 kg) determined according to ISO 1133 in the range of 0.5 to 30 g/10 min; and
   a2) the propylene based plastomer with a density determined according to ISO 1183-1 in the range of 0.850 to 0.910 g/cm³ and a $MFR_2$ (230° C., 2.16 kg) determined according to ISO 1133 in the range of 0.01 to 30 g/10 min;
   shredding the recycled coated polyolefin fabric substrate to form shreds of recycled coated polyolefin fabric substrate; and
   combining:
   A) 5 to 35 wt.-% based on the overall weight of the polymer composition of said shreds of recycled coated polyolefin fabric substrate; and
   B) 65 to 95 wt.-% based on the overall weight of the polymer composition of the homopolypropylene or the recycled polymer blend comprising b1) polypropylene and b2) polyethylene, wherein the weight ratio of b1) to b2) is from 3:7 to 12:1.

17. An article comprising the polymer composition as defined in claim 1.

18. The article according to claim 17, wherein the article is selected from the group consisting of consumer goods and houseware.

* * * * *